(12) United States Patent
Fan et al.

(10) Patent No.: US 10,632,602 B2
(45) Date of Patent: Apr. 28, 2020

(54) FASTENER-DRIVING TOOL HAVING A SUPERCONDUCTOR POWER SOURCE

(71) Applicant: Illinois Tool Works Inc., Glenview, IL (US)

(72) Inventors: Chinbay Q. Fan, Chicago, IL (US); Patrick Talano, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 231 days.

(21) Appl. No.: 15/801,521

(22) Filed: Nov. 2, 2017

(65) Prior Publication Data
US 2018/0141198 A1   May 24, 2018

Related U.S. Application Data

(60) Provisional application No. 62/425,825, filed on Nov. 23, 2016.

(51) Int. Cl.
   *B25C 1/06* (2006.01)
   *H02J 7/00* (2006.01)
   (Continued)

(52) U.S. Cl.
   CPC .......... *B25C 1/06* (2013.01); *B25C 1/008* (2013.01); *H02J 7/0057* (2013.01); *H02J 7/0068* (2013.01); *H02J 7/345* (2013.01)

(58) Field of Classification Search
   CPC .......... B25C 1/06; B25C 1/008; H02J 7/0057; H02J 7/0068; B27F 7/36
   (Continued)

(56) References Cited

U.S. PATENT DOCUMENTS

3,934,656 A * 1/1976 Pappert ................. E02D 1/022
                                                    173/124
4,753,153 A * 6/1988 Jasper, Jr. ............. F41B 6/006
                                                    124/3
(Continued)

FOREIGN PATENT DOCUMENTS

WO   WO 02/16085   2/2002

OTHER PUBLICATIONS

"Conductive Ceramics as Electrical Materials at High Temperatures," Dr. Hans-Peter Martin, Annual Report 2014/15 (1 page).
(Continued)

*Primary Examiner* — Hemant Desai
*Assistant Examiner* — Bashir Alsaidi
(74) *Attorney, Agent, or Firm* — Neal, Gerber & Eisenberg LLP

(57) ABSTRACT

The present disclosure provides various embodiments of a fastener-driving tool that includes a battery-charged supercapacitor as a power source. The fastener-driving tool includes first and second spaced-apart, conductive rails and a partially conductive piston slidably mounted on the rails. The rails and the piston are electrically connected to one another. The supercapacitor is electrically connected to the first rail. When the supercapacitor discharges electrical current, the electrical current flows from the supercapacitor, into the first rail, through the piston into the second rail, and from the second rail. The electrical current induces magnetic fields in the rails and the piston, and the combination of the electrical current and the magnetic fields induce a Lorentz force that acts on the piston to move the piston toward a nosepiece to drive a fastener.

14 Claims, 8 Drawing Sheets

(51) Int. Cl.
*B25C 1/00* (2006.01)
*H02J 7/34* (2006.01)

(58) Field of Classification Search
USPC ..... 227/131, 140, 8; 173/148, 149, 165, 217
See application file for complete search history.

(56) References Cited

U.S. PATENT DOCUMENTS

| | | | |
|---|---|---|---|
| 4,833,965 A | | 5/1989 | Jasper, Jr. |
| 5,167,107 A | * | 12/1992 | Terminella ............. B29C 65/18 |
| | | | 53/551 |
| 5,878,483 A | * | 3/1999 | Kman .................... H01R 12/58 |
| | | | 29/739 |
| 2003/0183670 A1 | * | 10/2003 | Barber ..................... B25C 1/06 |
| | | | 227/131 |
| 2008/0179371 A1 | * | 7/2008 | Gardner .................. B25C 5/15 |
| | | | 227/1 |
| 2010/0032468 A1 | * | 2/2010 | Gross ...................... B25C 1/06 |
| | | | 227/131 |
| 2013/0334277 A1 | * | 12/2013 | Shima ..................... B25F 5/00 |
| | | | 227/131 |
| 2018/0151303 A1 | * | 5/2018 | Maimon ............. H01G 9/2027 |

OTHER PUBLICATIONS

"Electromagnetic Coil Gun," Final Report, Chan et al., Rutgers School of Engineering, May 1, 2013 (84 pages).
"Electromagnetic Railgun," NDIA Joint Armaments, Forum, Exhibition & Technology Demonstration, LCDR Jason Fox, USN, May 14, 2014 (18 pages).
"Hypervelocity Electromagnetic Gun Development at CEM-UT," Zowarka et al., Center for Electromechanics, The University of Texas at Austin, Oct. 1985 (13 pages).
"Launch to Space with an Electromagnetic Railgun," McNab, IEEE Transactions on Magnetics, vol. 39, No. 1, Jan. 2003 (10 pages).
"Navy Lasers, Railgun, and Hypervelocity Projectile: Background and Issues for Congress," Ronald O'Rourke, Congressional Research Service, Jun. 17, 2016 (45 pages).
"Railgun Launcher Efficiency: Useful Measure of Misused Metric?", Zielinski et al., Army Research Laboratory, May 2001 (26 pages).
"Tradeoff between Efficiency and Melting for a High-Performance Electromagnetic Rail Gun," McCorkle et al., Army Aviation and Missile Research, Development, and Engineering Center, Aug. 11, 2010 (10 pages).
"Transient Response of an Electromagnetic Rail Gun: A Pedagogical Model," Bander et al., Army Research Laboratory, May 1998 (30 pages).

* cited by examiner

FASTENER-DRIVING TOOL HAVING A SUPERCONDUCTOR POWER SOURCE

PRIORITY

This application claims priority to and the benefit of U.S. Provisional Patent Application Ser. No. 62/425,825, filed Nov. 23, 2016, the entire contents of which are incorporated herein by reference.

BACKGROUND

Powered fastener-driving tools are well known and widely used throughout the world. Generally, powered fastener-driving tools employ one of a variety of power sources to drive a fastener into a workpiece. More specifically, a powered fastener-driving tool uses a power source to drive a piston carrying a driver blade through a cylinder from a pre-firing position to a firing position. As the piston moves to the firing position, the driver blade enters a nosepiece, which guides the driver blade into contact with a fastener housed in the nosepiece. Continued movement of the driver blade through the cylinder forces the fastener from the nosepiece and into the workpiece.

Three main types of fastener-driving tools exist: (1) pneumatic fastener-driving tools that use compressed air as a power source; (2) combustion fastener-driving tools that use a combustion engine as a power source; and (3) electric fastener-driving tools that use an electric motor as a power source. Each type of fastener-driving tool has certain advantages and certain disadvantages.

Pneumatic fastener-driving tools rely on a compressed air source, which adds to the cost of the tool since an air compressor must be purchased (or rented) and maintained. Pneumatic fastener-driving tools also require a compressed air hose to be attached to the tool during use to supply the compressed air. The user may spend time inspecting the hose for cracks or other defects that would reduce how much compressed air reaches the tool (reducing performance), which slows the user down. Further, replacing broken hoses increases costs.

Combustion fastener-driving tools rely on fuel cells to function. The fuel cells include liquid fuel that is meted out into a combustion chamber and ignited to drive the piston. The fuel cells must eventually be replaced, which increases the lifetime cost of ownership of combustion fastener-driving tools and requires users to spend time checking the fuel supply.

Electric fastener-driving tools typically rely on large and heavy electric motors to obtain sufficient fastener-driving power.

A continuing need exists to develop new and improved fastener-driving tools that are lighter, less expensive, and easier to operate and maintain than existing fastener-driving tools.

SUMMARY

The present disclosure provides various embodiments of a fastener-driving tool that includes a battery-charged supercapacitor as a power source. The fastener-driving tool includes first and second spaced-apart, conductive rails and a partially conductive piston slidably mounted on the rails. The rails and the piston are electrically connected to one another. The supercapacitor is electrically connected to the first rail. When the supercapacitor discharges electrical current, the electrical current flows from the supercapacitor, into the first rail, through the piston into the second rail, and from the second rail. The electrical current induces magnetic fields in the rails and the piston, and the combination of the electrical current and the magnetic fields induce a Lorentz force that acts on the piston to move the piston toward a nosepiece to drive a fastener.

Unlike pneumatic fastener-driving tools, compressed air doesn't power the fastener-driving tool of the present disclosure, which leads to lower costs and easier use. Unlike combustion fastener-driving tools, the fastener-driving tool of the present disclosure does not require replaceable fuel cells, which also leads to lower costs and easier use. Unlike electric fastener-driving tools, the fastener-driving tool of the present disclosure does not need a large and heavy electric motor to generate sufficient fastener-driving power. Instead, the fastener-driving tool of the present disclosure uses relatively lightweight rails and superconductors to generate power for fastener driving, which leads to easier use.

Other objects, features, and advantages of the present disclosure will be apparent from the detailed description and the drawings.

DETAILED DESCRIPTION

Figure 1:
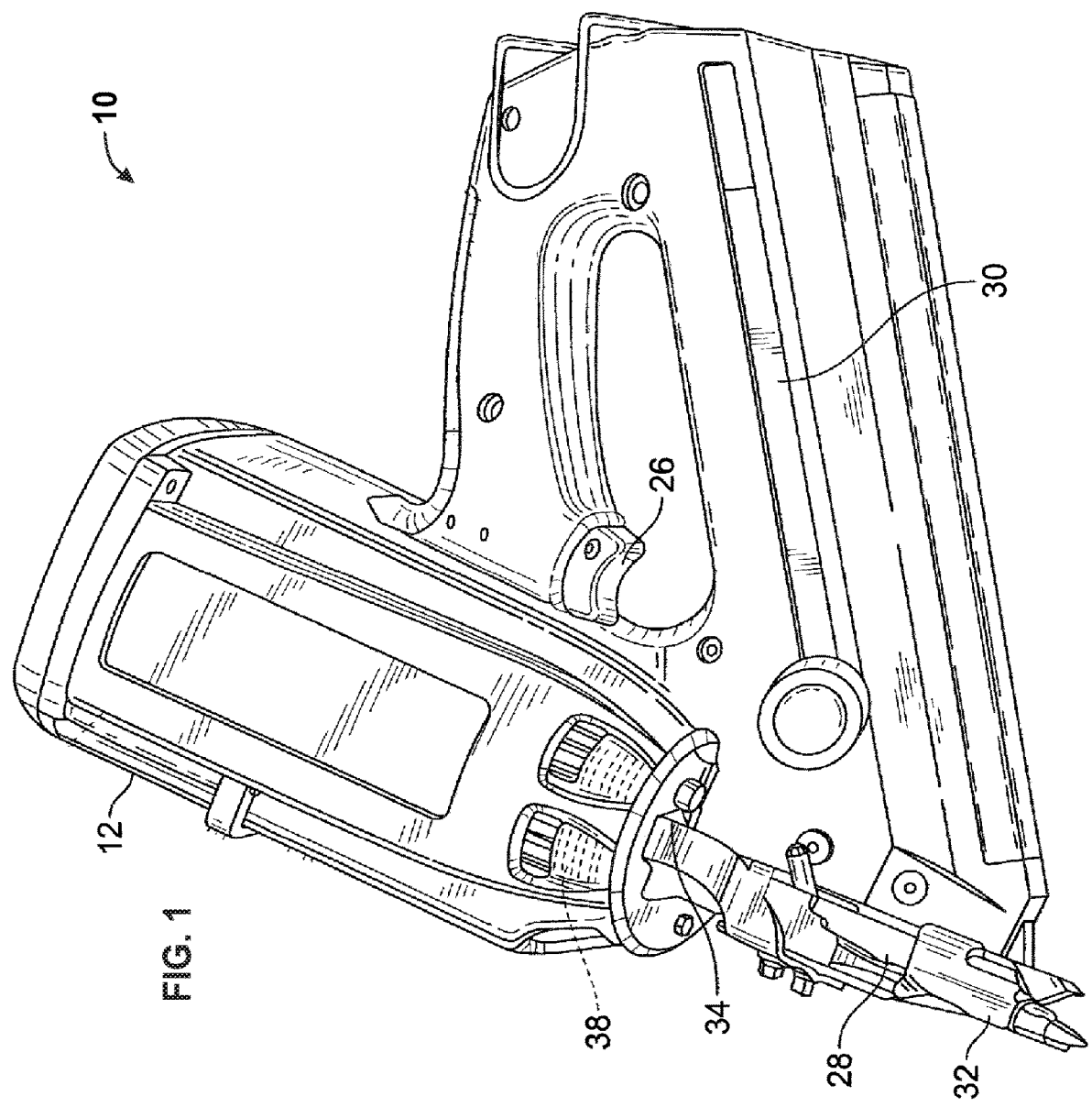
FIG. 1 is a perspective view of one example embodiment of the fastener-driving tool of the present disclosure.

Referring now to the drawings, FIGS. 1 to 8 illustrate one example embodiment of a fastener-driving tool 10 of the present disclosure. This example embodiment of the fastener-driving tool 10 drives nails and is referred to below as a "rail nailer." In other embodiments, the fastener-driving tool may drive any suitable types of fasteners other than nails (such as brads or staples). The example rail nailer 10 includes: (1) a housing 12; (2) a power system 100 that powers various components of the rail nailer 10; (3) spaced apart, generally parallel first and second conductive rails 35a and 35b (also called "rails" for brevity); (4) an at least partially conductive piston 50 (also called the "piston" for brevity); (5) a driver blade 55; (6) a trigger 26; (7) a trigger switch (not shown); (8) a nosepiece 28; (9) a fastener magazine 30; (10) a workpiece contact element (WCE) 32; (11) a WCE switch (not shown); (12) a linkage 34; (13) a WCE biasing member 38; (14) a piston movement and locking assembly including a pair of first springs 40a and 40b; and (15) a piston return assembly including a pair of second springs 45a and 45b.

As best shown in FIGS. 2 to 8, the first and second rails 35a and 35b are at least partially enclosed within and supported by the housing 12 and oriented so their longitudinal axes are generally parallel to a main axis A of the rail nailer 10. The first and second rails 35a and 35b are made of a conductive material, such as copper or a copper alloy, coated with a conductive material that tolerates high temperatures and reduces friction between the rails 35a and 35b and the piston 50. This conductive material may include, for instance, vitreous carbon, graphite, graphene, metal carbides (e.g., zirconium carbide or titanium carbide), metal nitrides (e.g., titanium nitride or tantalum nitride), indium tin oxide, or any other suitable material. In certain embodiments, the first and second rails 35a and 35b are tubular in that they each define a bore or partial bore generally aligned with their respective longitudinal axes. In certain embodiments, the bores or partial bores of the first and second rails 35a and 35b are filled with phase change material to dissipate heat, and specifically to absorb the heat generated during fastener driving. The phase change material could include, for instance, Wood's metal, Rose's metal, or any other suitable fusible metal alloy.

Figure 4:
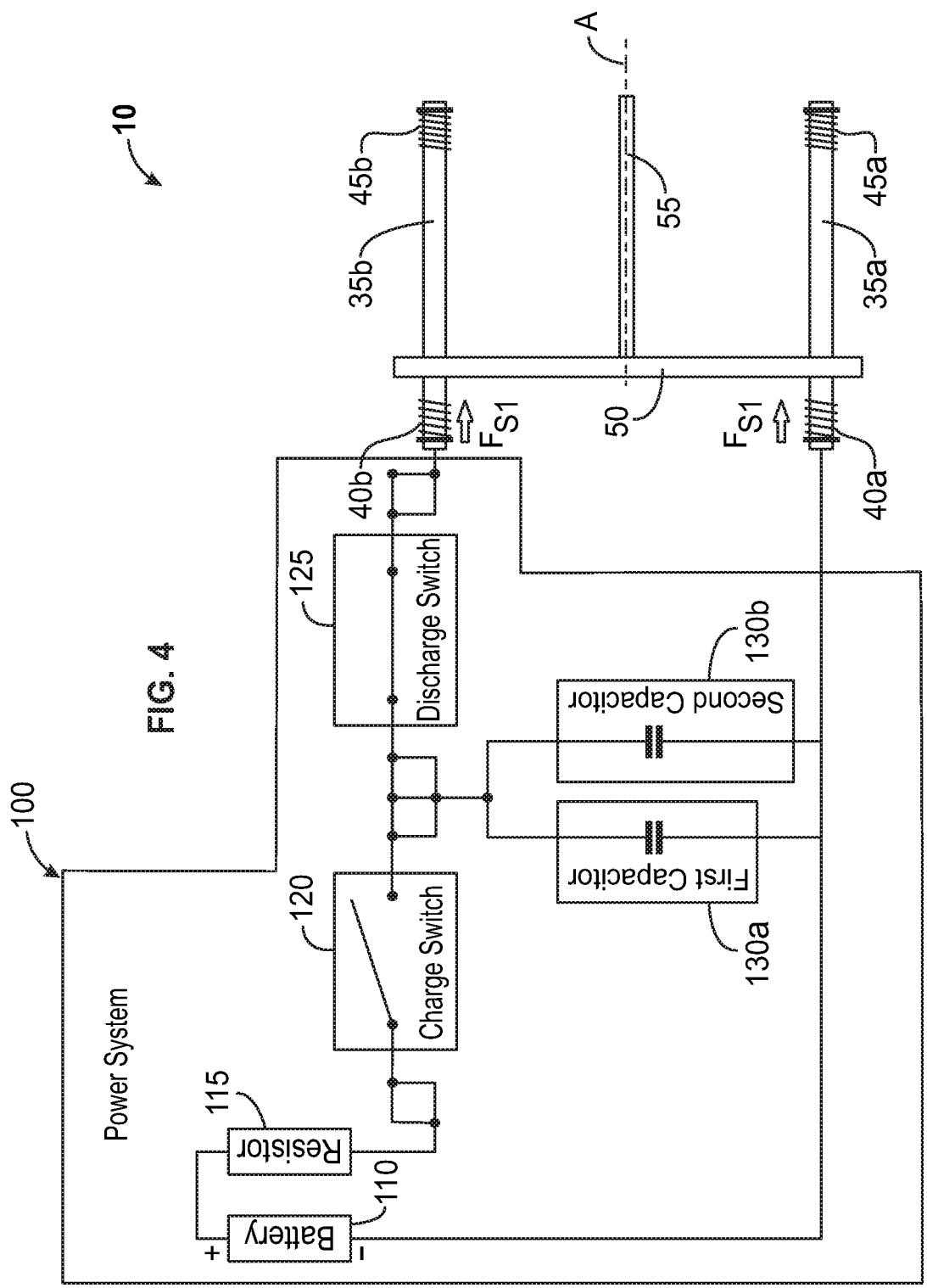
Figure 5:
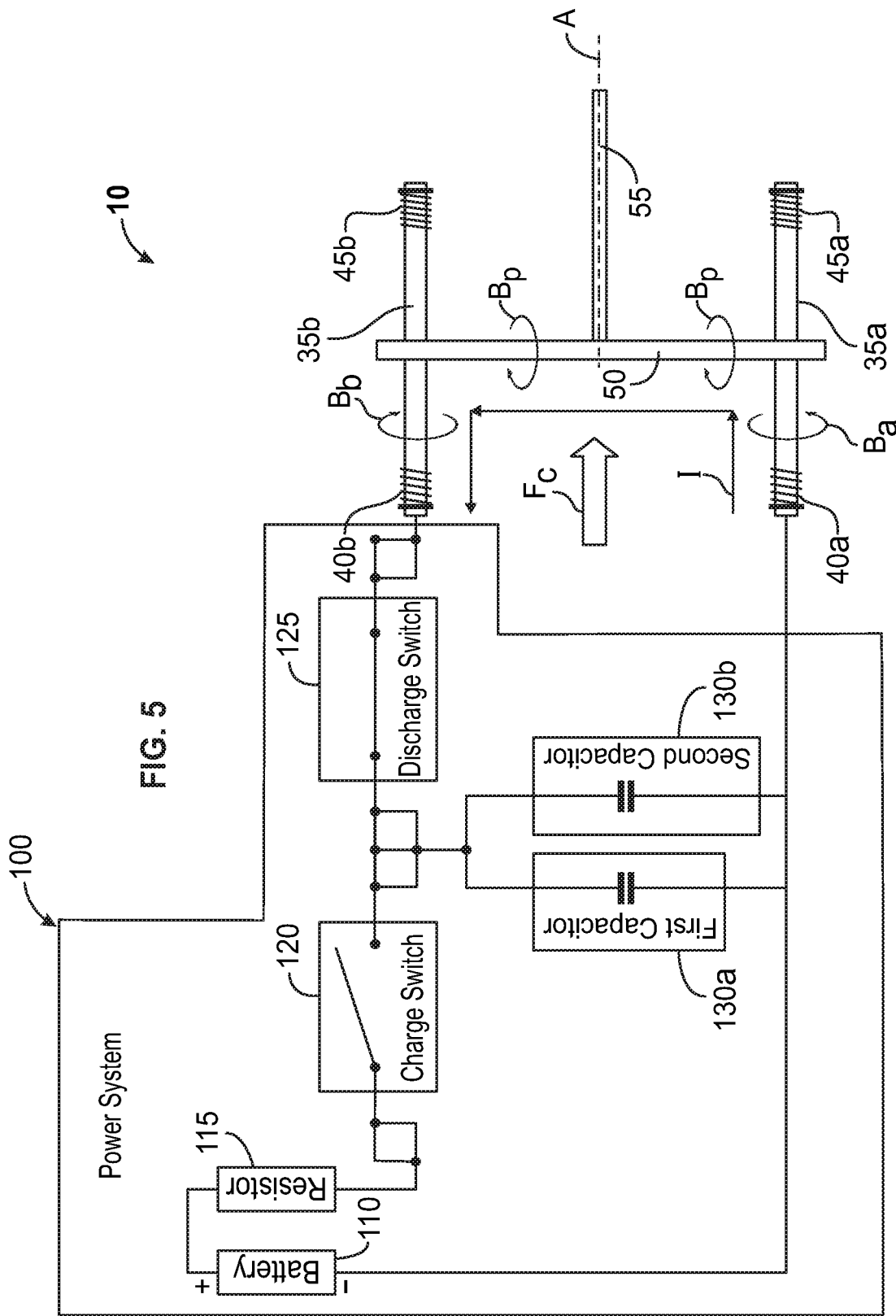
Figure 6:
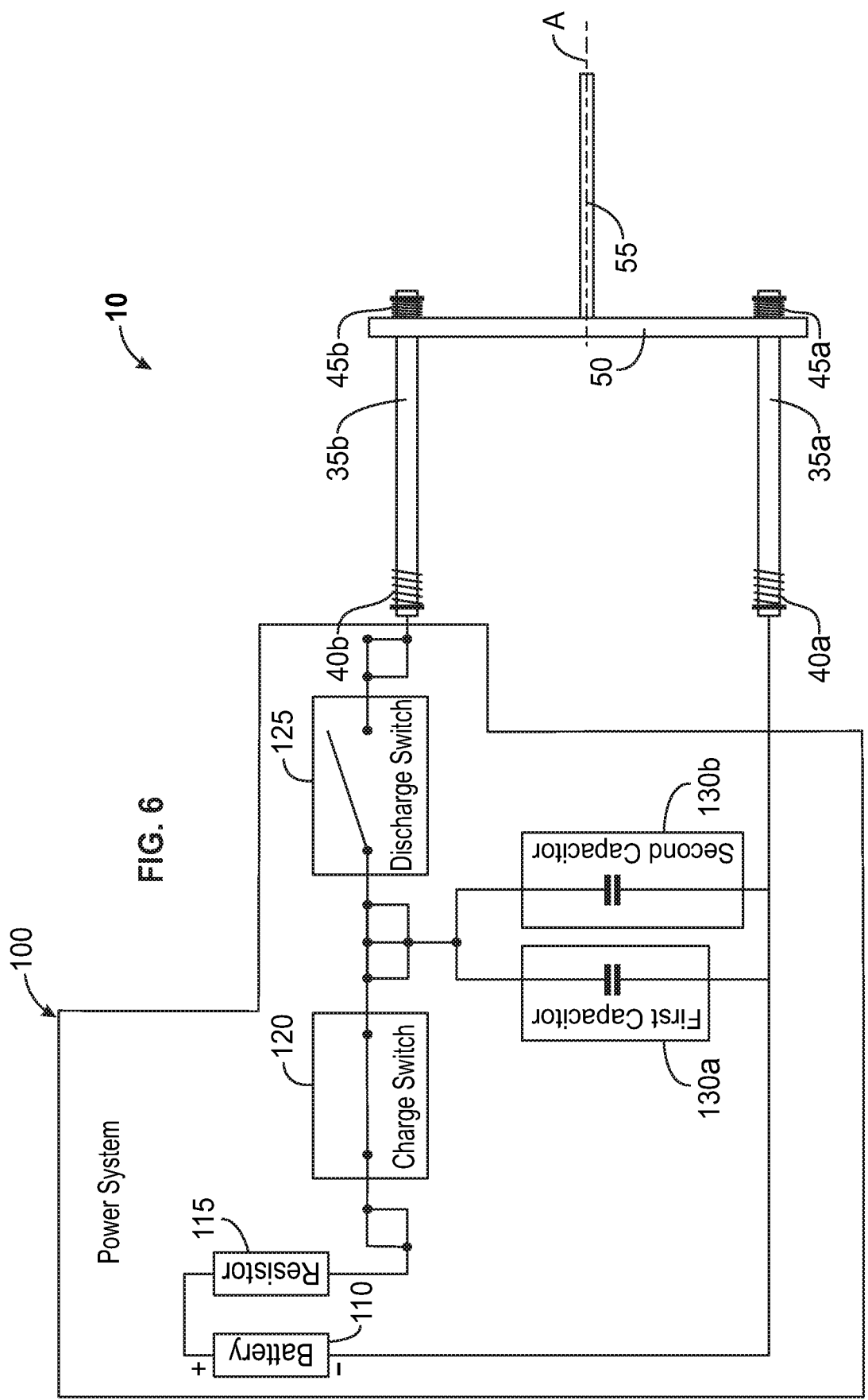

As best shown in FIGS. 2 to 8, the piston 50 has a body that defines two through holes sized to receive the first and second rails 35a and 35b to enable the piston 50 to be slidably mounted to the first and second rails 35a and 35b. Once mounted to the first and second rails 35a and 35b, the piston 50 is movable relative to the first and second rails 35a and 35b between a pre-firing position (FIGS. 2, 3, and 8) and a firing position (FIG. 6). Part of the portion of the body of the piston 50 between the first and second rails 35a and 35b is made of a suitable conductive material, such as copper or a copper alloy. Other portions of the body of the piston 50 may be made of any suitable conductive or non-conductive materials, such as molded fiberglass, plastic, or other metals. Similar to the rails 35a and 35b, the inner surfaces of the through holes are coated with a conductive material that tolerates high temperatures and reduces friction between the first and second rails 35a and 35b and the piston 50 (such as any of the materials described above with respect to the conductive coating of the first and second rails 35a and 35b). In other embodiments, the piston is not mounted directly to the rails, but is nevertheless electrically connected to and slidable relative to the rails.

The piston 50 and the first and second rails 35a and 35b, and particularly the thickness of the piston and the cross-sectional areas of the first and second rails perpendicular to their longitudinal axes, are sized to ensure the contact area between the piston and the first and second rails is large enough to conduct the requisite electrical current and to dissipate the heat to the electrical current generates. This (in part) prevents the high heat generated during fastener driving from welding the piston 50 to the first and second rails 35a and 35b.

As best shown in FIGS. 2 to 8, the driver blade 55 extends from the piston 50 in the direction of the nosepiece 28. A longitudinal axis of the driver blade 55 is generally aligned with the main axis A of the rail nailer 10.

The piston movement and locking assembly is configured to hold the piston 50 in the pre-firing position and to initiate piston movement upon closure of the discharge switch 125. As best shown in FIGS. 2 to 8, the piston movement and locking assembly includes the first springs 40a and 40b respectively mounted on the first and second rails 35a and 35b near their first ends. The piston movement and locking assembly also includes a locking device (not shown) that is configured to engage the piston 50 and hold the piston 50 in the pre-firing position. In certain embodiments, the locking device includes one or more mechanical linkages operably connected to the WCE 32, the trigger 26, or both so movement of the WCE 32 from the WCE rest position to the WCE firing position and/or movement of the trigger 26 from the trigger rest position to the trigger firing position causes the mechanical linkage to move to release the piston 50. In other embodiments, the locking device includes one or more electromechanical components controlled by a controller that causes the locking device to release the piston 50 when certain conditions are met (such as the conditions for fastener driving described below with respect to the rail nailer operating modes).

The piston return assembly is configured to return the piston to the pre-firing position after the driver blade 55 drives a fastener. In this example embodiment, the piston return assembly includes the second springs 45a and 45b respectively mounted on the first and second rails 35a and 35b near their second ends opposing their first ends.

As best shown in FIG. 1, the nosepiece 28 is connected to the housing 12, and the fastener magazine 30 is attached to the nosepiece 28 such that the fastener magazine 30 can feed fasteners into the nosepiece 28. The nosepiece 28, the first and second rails 35a and 35b, the piston 50, and the driver blade 55 are sized, shaped, and oriented relative to one another to enable the driver blade 55 to drive fasteners that the fastener magazine 30 feeds into the nosepiece 28 into a workpiece (not shown).

As best shown in FIG. 1, the nosepiece 28 includes the WCE 32. The WCE 32 is movable relative to the housing 12 between a WCE rest position in which the WCE 32 is a first distance from the housing 12 and a WCE firing position in which the WCE 32 is a second, shorter distance from the housing 12. Movement of the WCE 32 from the WCE rest position to the WCE firing position causes the WCE to activate a WCE switch (not shown), such as via the linkage 34. The WCE biasing member 38, which is a spring in this example embodiment, biases the WCE 32 to the WCE rest position.

As best shown in FIG. 1, the trigger 26 is supported by the housing 12, and is movable (such as pivotable) between a trigger rest position and a trigger firing position. Movement of the trigger 26 from the trigger rest position to the trigger firing position causes the trigger 26 to activate a trigger switch (not shown).

As best shown in FIGS. 2 to 8, the power system 100 includes: (1) a battery 110; (2) a resistor 115; (3) a charge switch 120; (4) a discharge switch 125; (5) first and second capacitors 130a and 130b; (6) a battery management system (not shown); and (7) one or more diodes (not shown).

The resistor 115 is electrically connected to the battery 110 and to the charge switch 120. The charge switch 120 is electrically connected to the discharge switch 125 and to the first and second capacitors 130a and 130b. The first and second capacitors 130a and 130b are electrically connected to the battery 110 and to the first rail 35a. The discharge switch 125 is electrically connected to the second rail 35b. Since (as described above) the piston 50 is at least partially conductive, the piston 50 is electrically connected to the first and second rails 35a. The battery management system is communicatively connected to the battery 110, the charge switch 120, and the first and second capacitors 130a and 130b.

The battery 110 is a rechargeable, lithium-ion battery (or other rechargeable or non-rechargeable battery having a suitably high energy density) operable to charge the first and second capacitors 130a and 130b when the charge switch 120 is closed (described below). The rail nailer 10 may include or be electrically connectable to any other suitable power source to charge the first and second capacitors 130a and 130b other than or in addition to a battery. In various embodiments, the battery 110 powers one or more other components of the rail nailer 10, such as a controller, one or more lights, one or more displays, or one or more speakers.

The resistor 115 is any suitable resistor configured to slow the rate at which the battery 110 charges the first and second capacitors 130a and 130b when the charge switch 120 is closed. This reduces the likelihood of damaging the battery 110 by reducing rapid discharge of battery power during capacitor charging. In certain embodiments, the power system doesn't include a resistor.

The charge switch 120 is any suitable electrical or electromechanical switch configured to: (1) close to complete an electrical charge circuit among the battery 110, the resistor 115, and the first and second capacitors 130a and 130b to enable electrical current to flow from the battery 110, through the resistor 115, and to the first and second capacitors 130a and 130b to charge the first and second capacitors 130a and 130b; and (2) open to break the charge circuit and prevent the battery 110 from charging the first and second capacitors 130a and 130b.

The first and second capacitors 130a and 130b include, for instance, any suitable high-power density electrochemical supercapacitors. The arrangement of the supercapacitors in the rail nailer 10 (e.g., within the housing 12) depends on the supercapacitor size, weight, voltage, and current. In certain embodiments, the first and second capacitors 130a and 130b have high energy and current densities that enable more than 100 amps of electrical current to pass through the piston 50 when the trigger switch 125 is closed. For example, Illinois Capacitor Inc. offers the superconductors listed in Table 1 below. The rail nailer may include any suitable quantity of capacitors.

TABLE 1

| Cap (F) | VDC | Max Current (A) | Operating Current (A) | Weight (g) | Volume (ml) | Dimension D × L (mm) |
|---|---|---|---|---|---|---|
| 200 | 2.5 | 250 | 50 | 39.39 | 35.343 | 30 × 50 |
| 1200 | 2.5 | 1500 | 300 | 350 | 197.92 | 60 × 70 |
| 2000 | 2.5 | 2500 | 500 | 480 | 339.29 | 60 × 120 |
| 3000 | 2.5 | 3000 | 750 | 623.8 | 452.39 | 60 × 160 |

The discharge switch 125 is any suitable electrical or electromechanical switch configured to open and close rapidly under the high current generated by the first and second capacitors 130a and 130b. The discharge switch 125 may be, for instance, a solenoid direct-current switch, a thyristor, a silicon-controlled rectifier, a high-current mechanical relay, a bipolar transistor, or a field-effect transistor. The discharge switch 125 is configured to: (1) close to complete a discharge electrical circuit among the first and second capacitors 130a and 130b, the first rail 35a, the piston 50, and the second rail 35a to enable electrical current to flow from the first and second capacitors 130a and 130b, through the first rail 35a into the piston 50, through the piston 50 and into the second rail 35b; and (2) open to break the discharge circuit and prevent the first and second capacitors 130a and 130b from discharging electrical current.

The diodes (not shown) prevent: (1) electrical current discharged from the first and second capacitors 130a and 130b from traveling to the battery 110; and (2) electrical current discharged from the battery 110 from reaching the discharge switch 125.

The battery management system (not shown) is operably connected to the charge switch 120 and configured to automatically control whether the charge switch 120 is closed (to enable the battery 110 to charge the first and second capacitors 130a and 130b) or open (to prevent the battery 110 from charging the first and second capacitors 130a and 130b). More specifically, the battery management system includes a controller and one or more monitoring devices (such as one or more sensors).

In certain embodiments, the controller includes a processing device communicatively connected to and configured to execute instructions stored in a memory device to control operation of the battery management system. The processor may be, for instance, a general-purpose processor; a content-addressable memory; a digital-signal processor; an application-specific integrated circuit; a field-programmable gate array; any suitable programmable logic device, discrete gate, or transistor logic; discrete hardware components; or any combination of these. The memory device is configured to store, maintain, and provide data as needed to support the functionality of the battery management system, such as program code or instructions executable by the processor to control the battery management system. The memory device may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The monitoring devices are configured to monitor the charge levels of the first and second capacitors 130a and 130b. The controller is configured to maintain the charge switch 120 closed (to enable the battery to charge the capacitors) so long as the charge level of at least one of the first and second capacitors 130a and 130b is below an upper charge level threshold, such as the capacitor's maximum charge level or any other suitable charge level.

After the controller determines that the charge levels of both of the first and second capacitors 130a and 130b have reached the upper charge level threshold, the controller is configured to automatically open the charge switch 120 to stop the flow of electrical current from the battery 110 to the first and second capacitors 130a and 130b. The controller continues to monitor the charge levels of both of the first and second capacitors 130a and 130b, and is configured to close the charge switch 120 responsive to the charge level of at least one of the first and second capacitors 130a and 130b falling below the upper charge level threshold. In other embodiments, the controller is configured to close the charge switch 120 responsive to the charge level of at least one of the first and second capacitors 130a and 130b falling below a lower charge level threshold that is lower than the upper charge level threshold. In one example embodiment, the lower charge level threshold reflects a charge level at which the capacitors do not have enough charge to enable normal fastener driving.

The battery management system is also configured to monitor the power or charge remaining in the battery and to shut down the rail nailer when the battery power falls below a threshold (such as 25% charge remaining) to protect the battery from overworking itself and reducing its lifetime.

Generally, and as described in detail below, closing the discharge switch 125 completes the discharge circuit and causes the piston 50 to move toward the nosepiece 28, which guides the driver blade 55 to contact and drive a fastener housed in the nosepiece 28 from the nosepiece 28 into a workpiece.

The rail nailer 10 is operable in one of two modes to close the discharge switch and initiate fastener driving: a sequential actuation mode and a contact actuation mode. In certain embodiments, the rail nailer 10 includes a mechanical or electromechanical switch, button, or other device that enables the user to select whether the rail nailer 10 operates in the sequential actuation mode or the contact actuation mode. In other embodiments, the rail nailer 10 is configured, such as through one or more mechanical, electromechanical, or electrical systems, to automatically switch between the sequential actuation mode and the contact actuation mode responsive to certain conditions being met or certain events occurring.

In the sequential actuation mode, the discharge switch closes responsive to activation of the WCE switch followed by activation of the trigger switch. For instance, to close the discharge switch 125 and drive a fastener when the rail nailer 10 is in the sequential actuation mode, a user depresses the WCE 32 against a workpiece until it moves to the WCE firing position, thereby activating the WCE switch, and then pulls the trigger 26 to move the trigger to the trigger firing position, thereby activating the trigger switch. Activation of the WCE switch alone, activation of the trigger switch alone, or activation of the trigger switch immediately before activation of the WCE switch will not close the discharge switch 125 when the rail nailer 10 is in the sequential actuation mode. To drive another fastener, the user releases the trigger 26 to enable it to return to the trigger rest position, removes the WCE 32 from the workpiece to enable it to return to the WCE rest position, and repeats the above process.

In the contact actuation mode in which the trigger 26 remains in the trigger firing position, the user first drives a fastener according to the process described above for the sequential actuation mode. Thereafter, so long as the trigger 26 remains in the trigger firing position, the discharge switch closes responsive to activation of the WCE switch. For instance, to close the discharge switch 125 and drive a fastener when the rail nailer 10 is in the contact actuation mode, a user holds the trigger 26 in the trigger firing position and depresses the WCE 32 against a workpiece until it moves to the WCE firing position, thereby activating the WCE switch. The user then removes the WCE 32 from the workpiece to enable it to return to the WCE rest position, and repeats the above process.

FIGS. 2 to 8 show schematic views of the power system 100, the first and second rails 35a and 35b, the first springs 40a and 40b, the second springs 45a and 45b, the piston 50, and the driver blade 55 in various stages of operation of the rail nailer 10 during capacitor charging and fastener driving.

Figure 2:
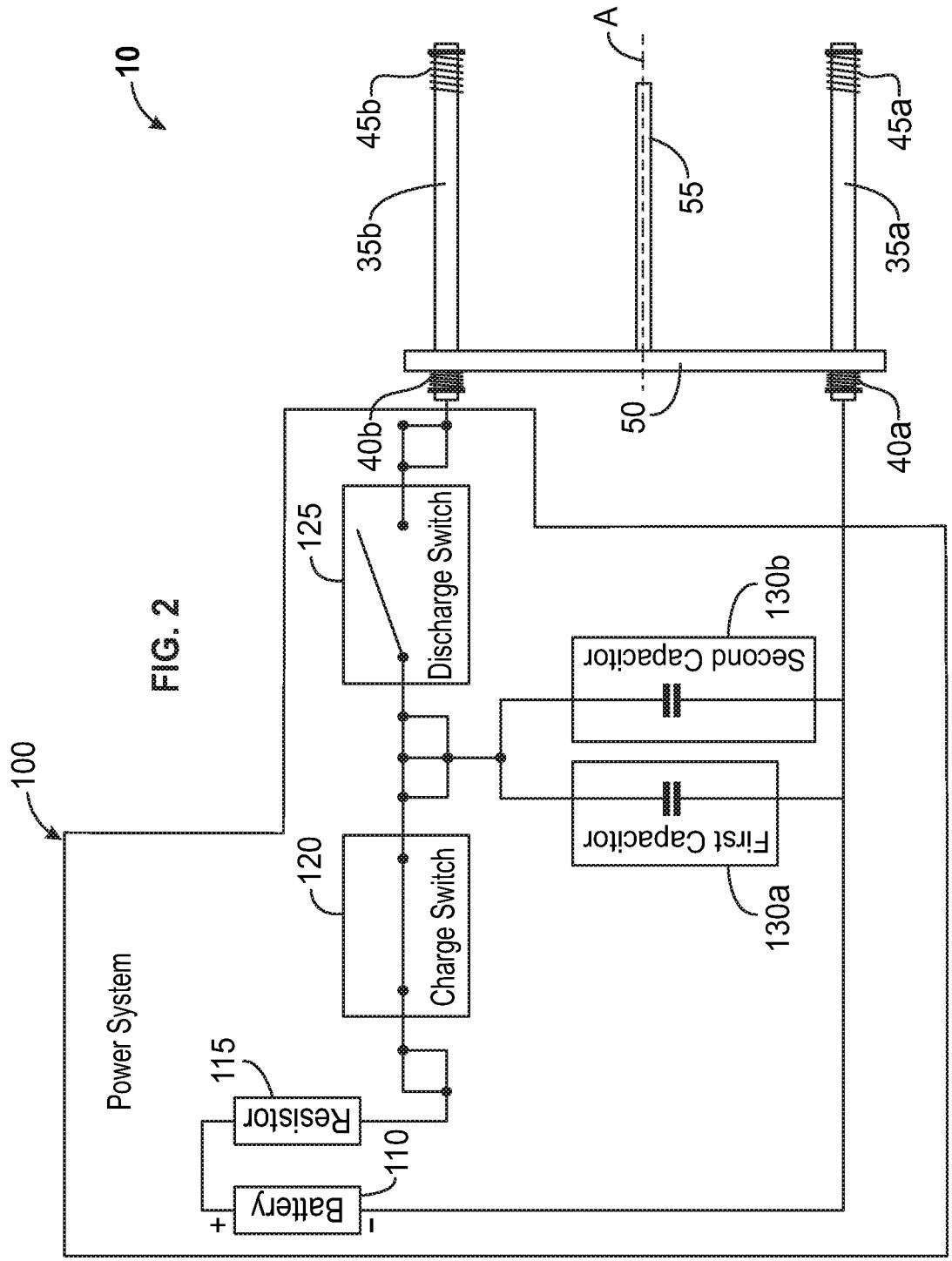
FIGS. 2 to 8 are partial schematic views of the fastener-driving tool of FIG. 1 during various stages of capacitor charging and fastener driving.

FIG. 2 shows the rail nailer 10 while the charge switch 120 is closed to complete the charge circuit and the battery 110 is charging the first and second capacitors 130a and 130b. The discharge switch 125 is open.

Figure 3:
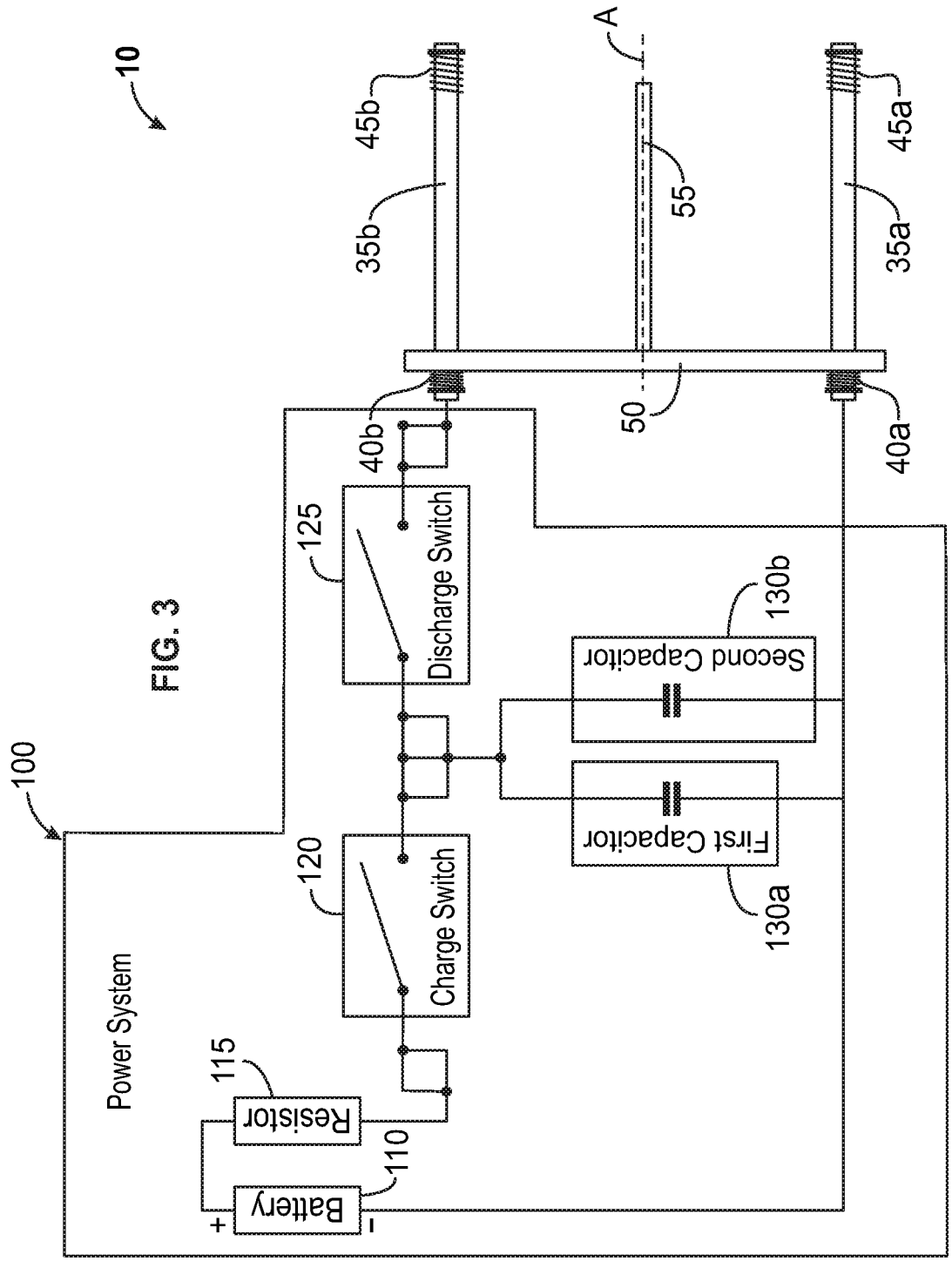

FIG. 3 shows the rail nailer 10 after the battery management system has determined that the charge levels of the first and second capacitors 130a and 130b have reached the upper charge level threshold and has opened the charge switch 120. The discharge switch 125 is also open.

FIG. 4 shows the rail nailer 10 just after the discharge switch 125 has closed. In this example embodiment, closure of the discharge switch causes the locking device of the piston movement and locking assembly to unlock and release the piston 50. This enables the first springs 40a and 40b to extend and impart a force $F_{S1}$ on the piston 50, which causes the piston 50 to start moving toward the nosepiece 28. This initial movement of the piston 50 reduces the likelihood that the heat generated by the electrical current discharged from the capacitors will weld the piston 50 to the first and second rails 35a and 35b. The charge switch 120 is open.

As shown in FIG. 5, closing the discharge switch 125 also causes the first and second capacitors 130a and 130b to discharge electrical current I, which travels into the first rail 35a. The electrical current I travels across the conductive portion of the piston 50, into the second rail 35b, and exits the second rail 35b toward the discharge switch 125. This electrical current I induces a magnetic field $B_a$ in the first rail 35a, a magnetic field $B_p$ in the piston 50, and a magnetic field $B_b$ in the second rail 35b. The combination of the electrical current I and the magnetic fields $B_a$, $B_p$, and $B_b$ induce a Lorentz force $F_C$ that acts on the piston 50 to move the piston 50 toward the nosepiece 28.

FIG. 6 shows the rail nailer 10 after the first and second capacitors 130a and 130b discharged and the discharge switch 125 has opened. The piston 50 has reached the firing position at the second ends of the first and second rails 35a and 35b, and the driver blade 55 has contacted a fastener housed in the nosepiece 28 and driven the fastener from the nosepiece 28 into a workpiece (not shown). The piston 50 has compressed second springs 45a and 45b. In this example embodiment, the discharge switch 125 is operably connected to the second springs 45a and 45b such that compression of the first and second springs 45a and 45b to a particular extent—here, the extent at which the piston 50 is in the firing position—causes the discharge switch 125 to open. In other embodiments, the rail nailer includes a suitable sensor, such as (but not limited to) a mechanical sensor, an optical sensor, or a Hall effect sensor, operably connected to the discharge switch 125 and positioned to trip when the piston 50 reaches a particular position (such as the firing position). In these embodiments, the discharge switch 125 opens responsive to the sensor trip.

Additionally, since the battery management system has detected that charge of at least one of the first and second capacitors 130a and 130b has fallen below the upper charge level threshold, the battery management system closes the charge switch 120 to enable the battery 110 to again charge the first and second capacitors 130a and 130b.

Figure 7:
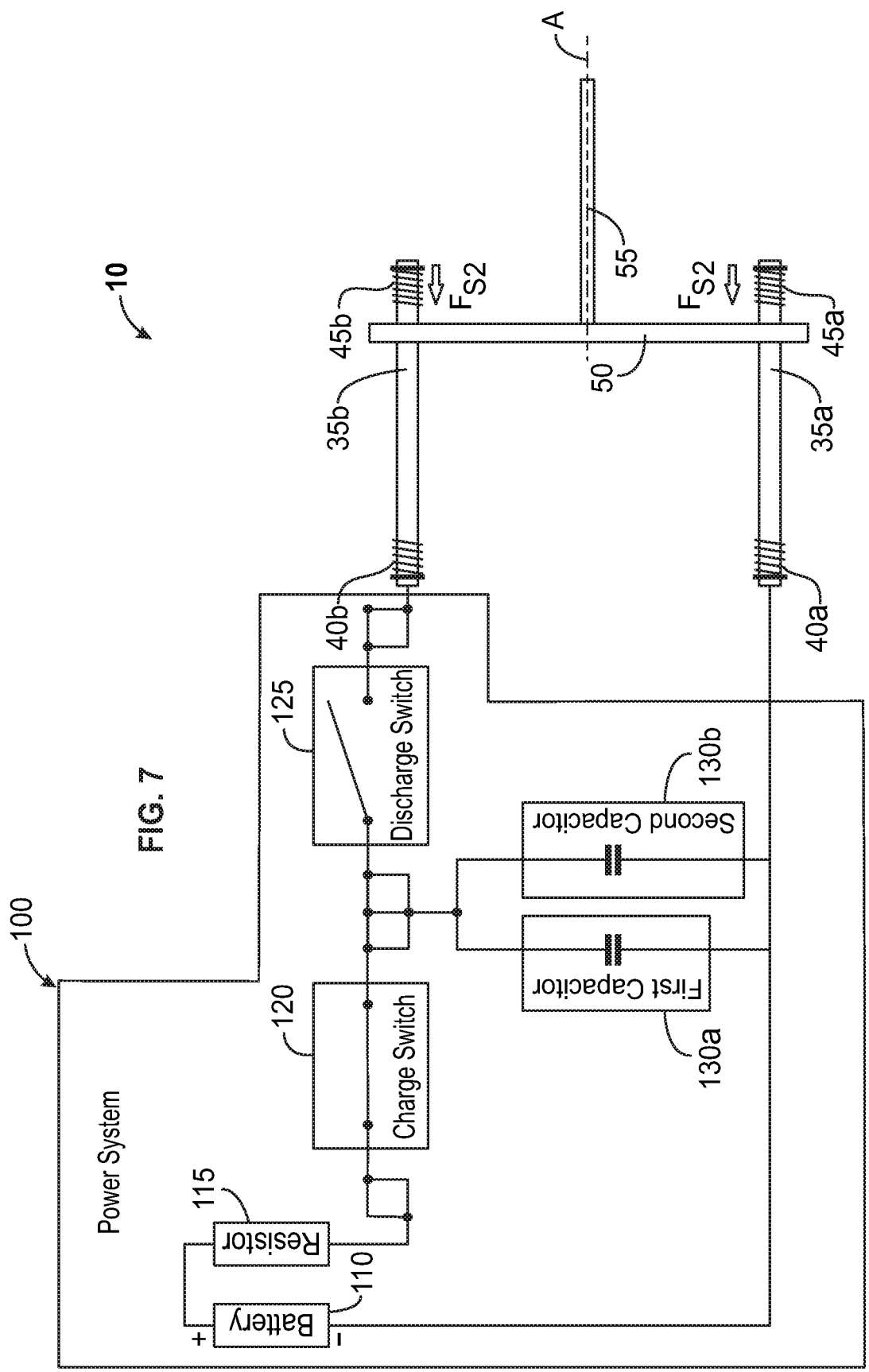

As shown in FIG. 7, after the piston 50 stopped moving and reached the firing position, the second springs 45a and 45b extended to impart a force $F_{S2}$ on the piston 50 to cause the piston 50 to move away from the nosepiece 28 and toward the pre-firing position. The charge switch 120 remains closed and the battery 110 still charges the first and second capacitors 130a and 130b.

Figure 8:
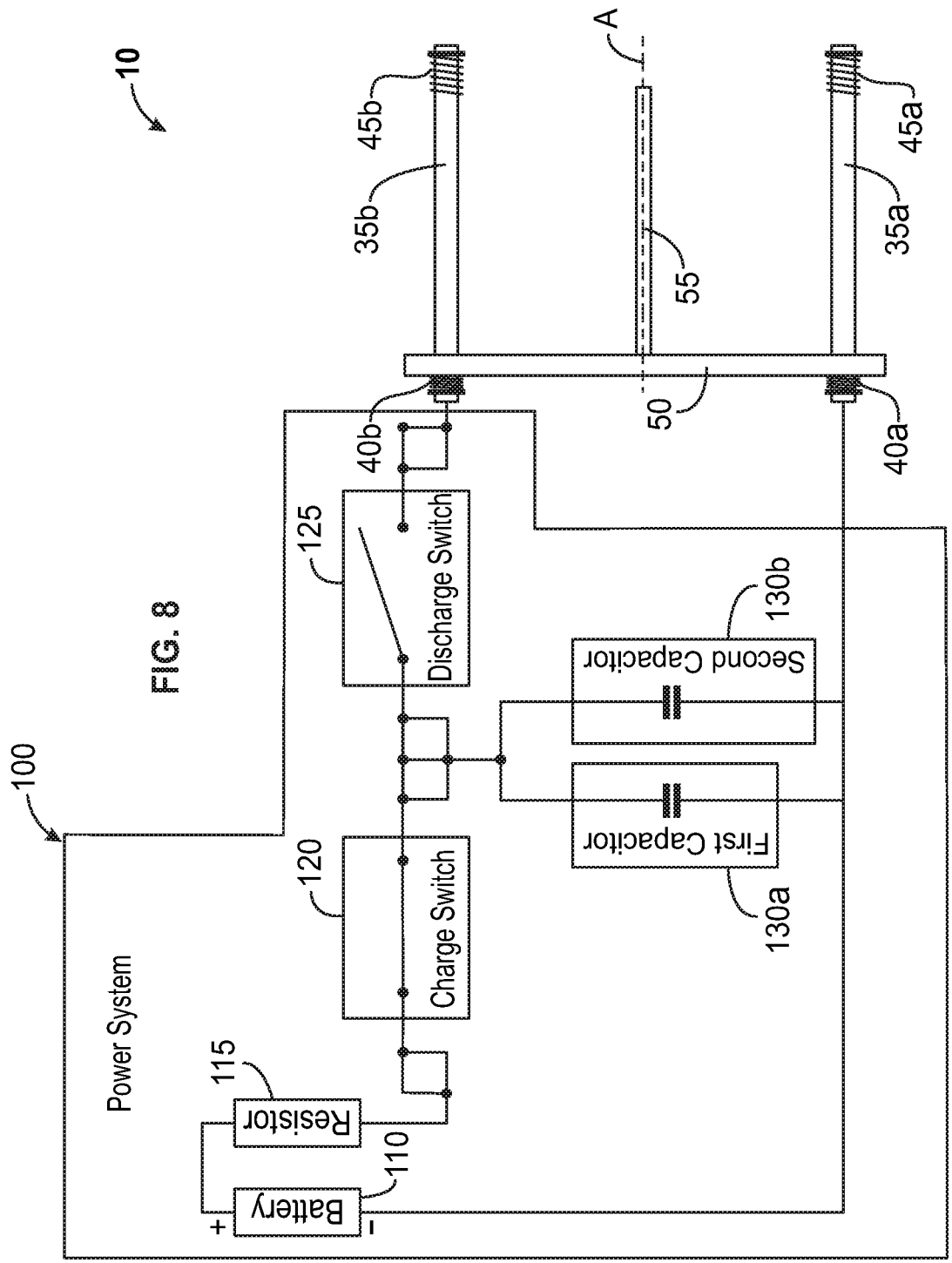

As shown in FIG. 8, the force $F_{S2}$ the second springs 45a and 45b imparted on the piston 50 caused the piston 50 to compress the first springs 40a and 40b and reach the pre-firing position. The locking device of the piston movement and locking assembly locks the piston 50 in place in the pre-firing position. The charge switch 120 remains closed and the battery 110 still charges the first and second capacitors 130a and 130b.

In certain embodiments, the rail nailer 10 includes a suitable cooling system (not shown), such as a fan or a radiator, to dissipate heat generated responsive to capacitor discharge.

Various changes and modifications to the above-described embodiments described herein will be apparent to those skilled in the art. These changes and modifications can be made without departing from the spirit and scope of this present subject matter and without diminishing its intended advantages. It is therefore intended that such changes and modifications be covered by the claims below.

The invention claimed is:

1. A fastener-driving tool comprising:
  a first conductive rail;
  a second conductive rail spaced apart from the first conductive rail;
  an at least partially conductive piston slidably mounted on the first and second rails, wherein the first rail, the second rail, and the piston are electrically connected to one another, wherein the piston defines two through holes through which the rails extend, and wherein the rails and inner surfaces that define the through holes are coated with a conductive material; and a capacitor electrically connected to the first rail so electrical current discharged from the capacitor can travel from the capacitor, through the first rail, through the piston, and through the second rail, thereby inducing a force on the piston.

2. The fastener-driving tool of claim 1, further comprising a power source electrically connectable to the capacitor to charge the capacitor.

3. The fastener-driving tool of claim 2, further comprising a charge switch, wherein the power source is electrically connected to the capacitor when the charge switch is closed and not electrically connected to the capacitor when the charge switch is open.

4. The fastener-driving tool of claim 3, further comprising a power source management system operably connected to the charge switch and including a sensor configured to detect a charge level of the capacitor.

5. The fastener-driving tool of claim 4, wherein the power source management system is configured to monitor the charge level of the capacitor and to: (1) open the charge switch responsive to the charge level of the capacitor reaching a first threshold; and (2) afterwards, close the charge switch responsive to the charge level of the capacitor falling to a second threshold.

6. The fastener-driving tool of claim 5, wherein the second threshold is lower than the first threshold.

7. The fastener-driving tool of claim 1, further comprising a discharge switch configured to control when the electrical current discharges from the capacitor.

8. The fastener-driving tool of claim 7, wherein closing the discharge switch completes a discharge circuit and causes the electrical current to discharge from the capacitor.

9. The fastener-driving tool of claim 8, wherein: (1) when the fastener-driving tool is in a first operating mode, the discharge switch closes responsive to a first actuation event followed by a second actuation event; and (2) when the fastener-driving tool is in a second operating mode, the discharge switch closes responsive to only the second actuation event.

10. The fastener-driving tool of claim 8, further comprising a piston movement assembly operably connected to the piston to move the piston.

11. The fastener-driving tool of claim 1, wherein the conductive material is one of: vitreous carbon, graphite, graphene, a metal carbide, a metal nitrides, and indium tin oxide.

12. A fastener-driving tool comprising:
a first conductive rail;
a second conductive rail spaced apart from the first conductive rail;
an at least partially conductive piston slidably mounted on the first and second rails so the first rail, the second rail, and the piston are electrically connected to one another, wherein the piston defines two through holes through which the rails extend, and wherein the rails and inner surfaces that define the through holes are coated with a conductive material;
a capacitor electrically connected to the first rail so electrical current discharged from the capacitor travels from the capacitor, through the first rail, through the piston, and through the second rail, thereby inducing a force on the piston;
a power source electrically connectable to the capacitor to charge the capacitor; and
a battery management circuit configured to monitor a charge level of the capacitor and automatically control whether the power source is electrically connected to the capacitor based on the charge level of the capacitor.

13. The fastener-driving tool of claim 12, wherein the battery management circuit is configured to electrically connect the power source to the capacitor responsive to the charge level falling below a first threshold.

14. The fastener-driving tool of claim 13, wherein the battery management circuit is configured to electrically disconnect the power source from the capacitor responsive to the charge level reaching a second different threshold.

* * * * *